United States Patent
Jiang et al.

(10) Patent No.: US 12,206,123 B2
(45) Date of Patent: Jan. 21, 2025

(54) BATTERY ASSEMBLY LOCKING DEVICE AND AUTOMATED GUIDED VEHICLE

(71) Applicant: Hangzhou Hikrobot Co., Ltd., Zhejiang (CN)

(72) Inventors: Hui Jiang, Zhejiang (CN); Chao Wu, Zhejiang (CN); Juming Huang, Zhejiang (CN); Wentao Yu, Zhejiang (CN)

(73) Assignee: Hangzhou Hikrobot Co., Ltd., Zhejiang (CN)

( * ) Notice: Subject to any disclaimer, the term of this patent is extended or adjusted under 35 U.S.C. 154(b) by 960 days.

(21) Appl. No.: 17/283,345

(22) PCT Filed: Sep. 30, 2019

(86) PCT No.: PCT/CN2019/109584
§ 371 (c)(1),
(2) Date: Apr. 7, 2021

(87) PCT Pub. No.: WO2020/078218
PCT Pub. Date: Apr. 23, 2020

(65) Prior Publication Data
US 2022/0006152 A1  Jan. 6, 2022

(30) Foreign Application Priority Data
Oct. 15, 2018 (CN) .......................... 201821664881.7

(51) Int. Cl.
*H01M 50/264* (2021.01)
*H01M 50/204* (2021.01)
*H01M 50/289* (2021.01)

(52) U.S. Cl.
CPC ....... *H01M 50/264* (2021.01); *H01M 50/204* (2021.01); *H01M 50/289* (2021.01); *H01M 2220/20* (2013.01)

(58) Field of Classification Search
None
See application file for complete search history.

(56) References Cited

U.S. PATENT DOCUMENTS

| 4,087,895 A * | 5/1978 | Etienne | B60L 50/66 254/93 HP |
| 2010/0071979 A1* | 3/2010 | Heichal | B60L 50/51 180/68.5 |
| 2016/0201362 A1* | 7/2016 | Mizuno | E05C 3/12 292/197 |

FOREIGN PATENT DOCUMENTS

| CN | 101559758 A | 10/2009 |
| CN | 102514471 A | 6/2012 |

(Continued)

OTHER PUBLICATIONS

CN108608891 A machine translation provided by Espacenet (Year: 2018).*
JP 2002362162 A, translation from Espacenet (Year: 2002).*

*Primary Examiner* — Haroon S. Sheikh
*Assistant Examiner* — Claire A Rutiser
(74) *Attorney, Agent, or Firm* — Bret E. Field; Bozicevic, Field & Francis LLP

(57) ABSTRACT

A battery assembly locking device and an automated guided vehicle comprising the battery assembly locking device. The battery assembly locking device comprises: a battery assembly (1); locking hooks (12), which are installed on the battery assembly (1); a locking member (22), which is installed on a vehicle body (3) of an automated guided vehicle; and unlocking members (13), which are installed on the battery assembly (1), wherein the battery assembly (1) is locked on the locking member (22) by means of the locking hooks (12), and is locked on the vehicle body (3) of the automated guided vehicle; and the locking hooks (12) push the locking member (22) by means of the unlocking mem- (Continued)

bers (13), and are unlocked from the locking member (22). By using the cooperation of the locking hooks (12) and the locking member (22) and the cooperation of the unlocking members (13) and the locking member (22), the battery assembly (1) may be locked on the vehicle body (3) of the automated guided vehicle, or the locking hooks (12) may be unlocked from the locking member (22) so that the battery assembly (1) and the vehicle body (3) of the automated guided vehicle are unlocked, thus facilitating the unlocking and disassembly of batteries, which is suitable for automated battery replacement of large batches of batteries.

11 Claims, 4 Drawing Sheets

(56) References Cited

FOREIGN PATENT DOCUMENTS

| | | |
|---|---|---|
| CN | 105781279 A | 7/2016 |
| CN | 206826383 U | 1/2018 |
| CN | 108608891 A | 10/2018 |
| CN | 209126851 U | 7/2019 |
| DE | 102004047339 A1 | 3/2006 |
| JP | S4954826 A | 5/1974 |
| JP | H06191289 A | 7/1994 |
| JP | 2002-362162 A | 12/2002 |
| JP | 2013112166 A | 6/2013 |
| JP | UP2013-112166 A | 6/2013 |
| JP | 2016125328 A | 7/2016 |

\* cited by examiner

BATTERY ASSEMBLY LOCKING DEVICE AND AUTOMATED GUIDED VEHICLE

The present application claims the priority to a Chinese patent application No. 201821664881.7, filed with the China National Intellectual Property Administration on Oct. 15, 2018 and entitled "BATTERY ASSEMBLY LOCKING DEVICE AND AUTOMATED GUIDED VEHICLE", which is incorporated herein by reference in its entirety.

TECHNICAL FIELD

The application relates to the field of battery mounting structures, in particular to a battery assembly locking device and an automated guided vehicle adopting the battery mounting device.

BACKGROUND

Currently, in battery-driven vehicles, such as Automated Guided Vehicles (AGVs), the battery for power driving is mounted in the Vehicle body by screws. When the battery is disassembled and replaced, the shell of the vehicle needs to be disassembled firstly, and then the battery is disassembled and replaced, it can be seen that the structure is not convenient for rapid battery replacement. Especially when a large number of vehicles need to replace the batteries, the efficiency of battery replacement is further reduced.

SUMMARY

In view of this, the embodiment of the present application provides a battery assembly locking device and an automated guided vehicle adopting the battery assembly locking device to improve the efficiency of battery installation.

The technical scheme of the embodiment of the present application is realized as follows:

A battery assembly locking device, including:
a battery assembly;
a locking hook mounted on the battery assembly;
a locking member mounted on a body of an automated guided vehicle; and
an unlocking member mounted on the battery assembly; wherein,
the battery assembly is locked on the body of the automated guided vehicle by locking the locking hook to the locking member;
the unlocking member pushes the locking member such that the locking hook unlocks with the locking member.

Optionally, the locking hook includes a fixing post and a locking post; wherein,
an end of the fixing post is mounted on the battery assembly, and the locking post and the fixing post are integrally formed and can be locked on the locking member.

Optionally, the locking member includes:
a fixing plate mounted on the body of the automated guided vehicle;
a locking arm connected to the fixing plate through a locking arm rotating shaft on the fixing plate, and the locking arm has a first rotational degree of freedom with the locking arm rotating shaft as an axis;
an unlocking arm connected to the fixing plate through an unlocking arm rotating shaft on the fixing plate, and the unlocking arm has a second rotational degree of freedom with the unlocking arm rotating shaft as an axis, wherein the unlocking arm rotating shaft is parallel to the locking arm rotating shaft; and wherein,
the locking arm has a first locking flange and a second locking flange, a locking groove is formed between the first locking flange and the second locking flange, and when the locking hook is locked on the locking member, the locking post is located in the locking groove;
the unlocking arm has a first positioning flange, when the locking hook is locked on the locking member, the first positioning flange is located between the first locking flange and the second locking flange, and the first positioning flange abuts against the first locking flange.

Optionally, a first torsion spring is sleeved around the locking arm rotating shaft, and the locking arm has a rotation tendency in a direction from the first locking flange to the second locking flange via the locking groove under the action of the first torsion spring;
a second torsion spring is sleeved around the unlocking arm rotating shaft, and the unlocking arm has a rotation tendency opposite to that of the locking arm under the action of the second torsion spring;
the fixing plate further has a first stop flange and a second stop flange; wherein,
when the locking member is unlocked from the locking hook, the locking arm rotates under the action of the first torsion spring, so that when the locking groove faces the locking hook, the edge of the second locking flange on the locking arm abuts against the first stop flange;
the unlocking arm further has a second positioning flange, and when the locking hook is locking on the locking member, the second positioning flange abuts against the second stop flange under the action of the second torsion spring.

Optionally, the unlocking arm further has an unlocking handle located at an end of the unlocking arm away from the unlocking arm rotating shaft, to rotate in a direction against the action of the second torsion spring under the pushing of the unlocking member, so that the unlocking handle is disengaged with the locking groove from a side of the first locking flange when the first positioning flange is located between the first locking flange and the second locking flange and abuts against the first locking flange.

Optionally, the unlocking member includes:
an unlocking sleeve mounted on the battery assembly;
an unlocking rod that is mounted in the unlocking sleeve, and faces the end of the locking member and there is a first distance between the unlocking rod and the unlocking handle provided in the locking member; and
a return spring mounted in the unlocking sleeve and sleeved outside the unlocking rod to provide the unlocking rod with a force increasing the first distance.

Optionally, the battery assembly includes:
a battery mounting plate;
a battery mounted on the battery mounting plate; wherein,
the locking hook is mounted on the battery mounting plate and is located on the side of the battery mounting plate facing the battery.

Optionally, the battery assembly locking device further includes:
a positioning assembly; wherein,
the battery assembly and the body of the automated guiding vehicle are mutually positioned with each other through the positioning assembly.

Optionally, the positioning assembly includes:
a guide sleeve mounted on the battery assembly;
a guide rod mounted on the body of the automated guided vehicle; wherein, the battery assembly and the body of the automated guided vehicle are mutually positioned with each other through the connection between the guide sleeve and the guide rod.

Optionally, the battery assembly includes:

a battery mounting plate; wherein, a battery mounted on the battery mounting plate; wherein, the guide sleeve is mounted on the battery mounting plate, and is located on the side of the battery mounting plate facing the battery, the guide sleeve has a guide rod receiving cavity facing the guide rod for receiving the guide rod.

Optionally, there is at least one locking hook, at least one locking member, and at least one unlocking member, and the numbers of the locking hook, the locking member and the unlocking member are equal.

When there are two locking hooks, the installation directions of at least one of the locking hook and the other locking hooks are not parallel.

Optionally, the positioning assemblies are at least one set.

An automated guided vehicle including:

the battery assembly locking device as described in any one of the above embodiments and an body of the automated guided vehicle.

It can be seen from the above scheme that the battery assembly locking device and the automated guiding vehicle can lock the battery assembly on the body of the automated guiding vehicle with the cooperating of the locking hook and the locking member, to achieve the purposes of simplifying battery installation and locking. In addition, the lock hook can be unlocked from the locking member with the cooperation of the unlocking member and the locking member, and then the battery assembly is unlocked from the body of the automated guided vehicle, thereby achieve the purposes of facilitating the unlocking and disassembly of the battery. In this way, it is conducive to the rapid disassembly and assembly of the battery, and is suitable for the automated replacement of large quantities of batteries.

BRIEF DESCRIPTION OF THE DRAWINGS

In order to explain the embodiments of the present application and the technical solutions of the prior art more clearly, the drawings needed in the embodiments and the prior art are briefly introduced below. Obviously, the drawings in the following description are merely some embodiments of the present application, and for those of ordinary skilled in the art, other drawings can be obtained based on these drawings without creative work.

Figure 1:
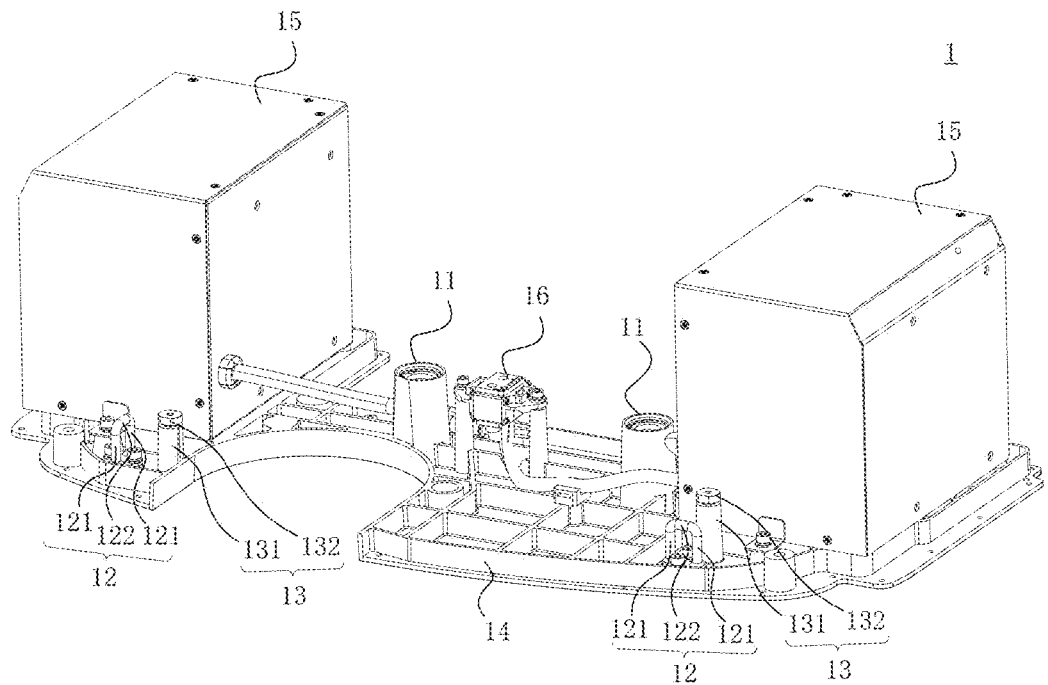
FIG. 1 is a schematic view of a battery assembly in a battery assembly locking device according to an embodiment of the present application.

In the drawings, the names of the components represented by the respective reference numerals are as follows:

1. battery assembly
11. guide sleeve
12. locking hook
121. fixing post
122. locking post
13. unlocking member
131. unlocking sleeve
132. unlocking rod
133. return spring
14. battery mounting plate
15. battery
16. female battery connector
21. guide rod
22. locking member
221. fixing plate
2211. first stop flange
2212. second stop flange
222. locking arm
2221. locking arm rotating shaft
2222. first locking flange
2223. second locking flange
2224. locking groove
223. unlocking arm
2231. unlocking arm rotating shaft
2232. first positioning flange
2233. second positioning flange
2234. unlocking handle
3. body
41. unlocking plate
42 unlocking button

DETAILED DESCRIPTION

To make the objective, technical solutions and advantages of the embodiments of the present application more clearly, the embodiments of the present application will be further described in detail below with reference to the accompanying drawings and the embodiments. Obviously, the described embodiments are only some instead all of the embodiments of the present application. Based on the embodiments of the present application, all other embodiments obtained by those of ordinary skill in the art without creative work shall fall within the protection scope of the embodiments of the present application.

The embodiment of the present application discloses a battery assembly locking device, including battery assembly, locking hook, locking member and unlocking member. The locking hook is mounted on the battery assembly; the locking member is mounted on the body of the automated guided vehicle; the unlocking member is mounted on the battery assembly. The battery assembly is locked on the body of the automated guided vehicle by locking the locking hook to the locking member; the unlocking member pushes the locking member such that the locking hook unlocks with the locking member.

The battery assembly locking device according to the embodiment of the present application can also include a positioning assembly; wherein the battery assembly and the body of the automated guiding vehicle are mutually positioned with each other through the positioning assembly. In one implementation, the positioning assemblies are at least one set.

In an embodiment according to the present application, a battery assembly may include a battery mounting plate and a battery. The battery is mounted on the battery mounting plate, and the locking hook is mounted on the battery mounting plate, and the locking hook is located the side of the battery mounting plate facing the battery.

In the embodiment according to the present application, there may be at least one locking hook, at least one locking member, and at least one unlocking member, and the numbers of the locking hook, the locking member and the unlocking member are equal. In one implementation, when there are at least two locking hooks, the mounting direction of at least one of the locking hooks is not parallel to that of the other locking hooks.

The embodiments of the present application will be described in detail below with reference to the drawings.

Figure 2:
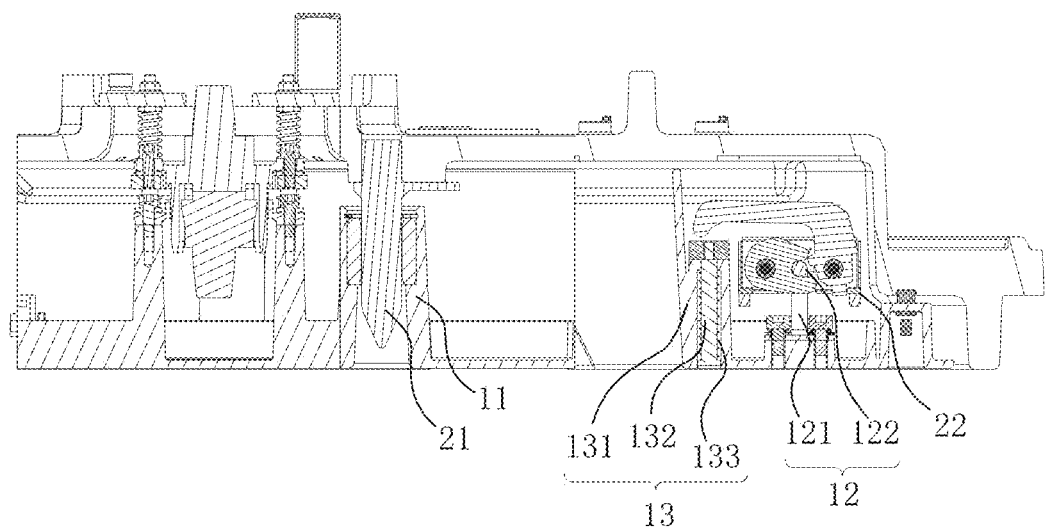
FIG. 2 is a cross-sectional view of a battery assembly locking device according to an embodiment of the present application.

FIG. 1 shows a structure of a battery assembly 1 side in a battery assembly locking device according to an embodiment of the present application in an implementation, and FIG. 2 shows a cross-sectional structure of the battery assembly locking device according to an embodiment of the present application in the implementation.

Referring to FIG. 1 and FIG. 2, in this implementation, the battery assembly locking device according to the embodiment of the present application includes a battery assembly 1, a positioning assembly, a locking hook 12, a locking member 22, and an unlocking member 13.

The battery assembly 1 and the body of the automated guided vehicle are mutually positioned with each other through the positioning assembly. In one implementation, the positioning assembly includes a guide sleeve 11 and a guide rod 21, the guide rod 21 is matched with the guide sleeve 11, so that the guide rod 21 is inserted into the guide sleeve 11, and then the battery assembly and the body of the automated guided vehicle can be mutually positioned with each other through the connection between the guide sleeve and the guide rod.

In one implementation, the locking member 22 is matched with the locking hook 12 to lock the locking hook 12 after the guide rod 21 is inserted into the guide sleeve 11. The unlocking member 13 is matched with the locking member 22 to unlock the locking hook 12 from the locking member 22 when the locking member 22 locks the locking hook 12.

In the embodiment of the present application, the battery assembly 1 includes a battery mounting plate 14 and a battery 15 mounted on the battery mounting plate 14. The guide sleeve 11 is mounted on the side of the battery mounting plate 14 facing the battery 15, and the guide sleeve 11 has a guide rod receiving cavity facing the guide rod 21 for receiving the guide rod 21.

In one implementation, the locking hook 12 includes a fixing post 121 and a locking post 122. One end of the fixing post 121 is mounted on the battery assembly 1. For example, the battery assembly 1 may include a battery mounting plate 14, a fixing post 121 may be mounted on the side of the battery mounting plate 14 facing the battery 15, the locking post 122 is integrally formed with the fixing post 121 and is matched with the locking member 22. The locking post 122 may be locked on the locking member 22.

Figure 3:
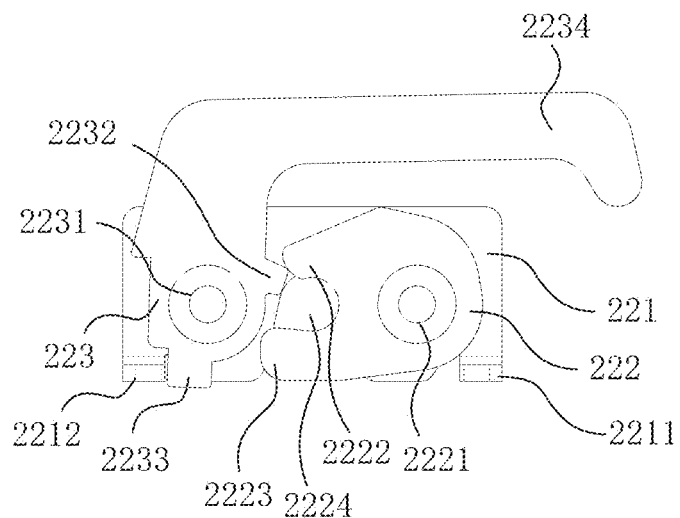
FIG. 3 is a schematic view of the locking member in a locked state according to an embodiment of the present application.
Figure 4:
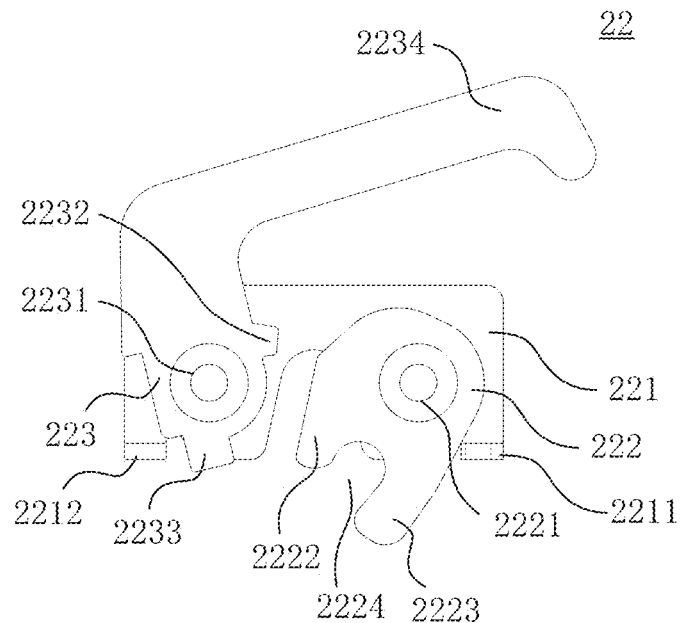
FIG. 4 schematically shows a raised unlocking arm when the locking member is in the unlocked state according to an embodiment of the present application.
Figure 5:
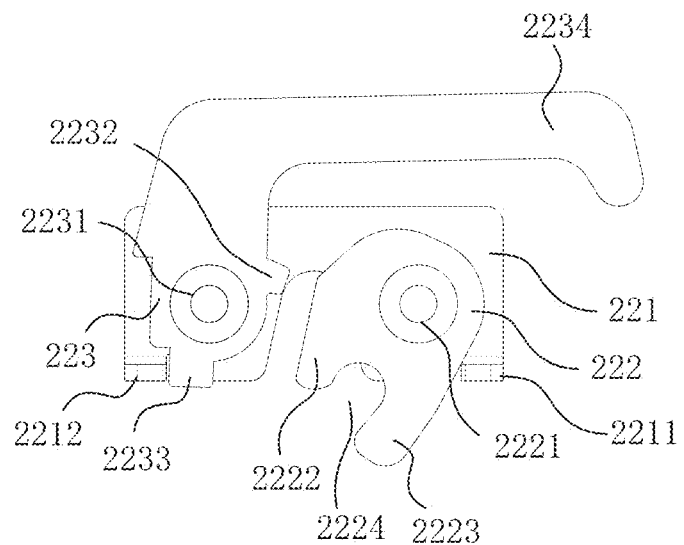
FIG. 5 is a schematic view of locking member when it is in the unlocked state and the unlocking arm restored according to an embodiment of the present application.

FIG. 3 shows a schematic view of the locking member 22 in the locked state according to an embodiment of the present application, and FIGS. 4 and 5 show a schematic view of the locking member 22 in the unlocked state according to an embodiment of the present application, in which FIG. 4 shows a state where the unlocking arm is raised, and FIG. 5 shows a state where the unlocking arm is restored.

As shown in FIG. 3, 4, 5 and in conjunction with FIG. 2, in the embodiment of the present application, the locking member 22 may include a fixing plate 221, a locking arm 222, a locking arm rotating shaft 2221, an unlocking arm 223, and an unlocking arm rotating shaft 2231.

The fixing plate 221 is mounted on the body of the automated guided vehicle, the locking arm rotating shaft 2221 and the unlocking arm rotating shaft 2231 are both located on the fixing plate 221, the locking arm 222 is connected to the fixing plate 221 through the locking arm rotating shaft 2221, and the locking arm 222 has a first rotational degree of freedom with the locking arm rotating shaft 2221 as an axis. The unlocking arm 223 is connected to the fixing plate 221 through the unlocking arm rotating shaft 2231, and the fixing arm 223 has a second rotational degree of freedom with the unlocking arm rotating shaft 2231. In one implementation, the unlocking arm rotating shaft 2231 is parallel to the locking arm rotating shaft 2221.

The locking arm 222 has a first locking flange 2222 and a second locking flange 2223, and a locking groove 2224 is formed between the first locking flange 2222 and the second locking flange 2223. When the locking hook 12 is locked on the locking member 22, the locking post 122 is located in the locking groove 2224, as shown in FIG. 2.

The unlocking arm 223 has a first positioning flange 2232. When the locking hook 12 is locked on the locking member 22, the first positioning flange 2232 is located between the first locking flange 2222 and the second locking flange 2223, and the first positioning flange 2232 abuts against the first locking flange 2222, as shown in FIGS. 2 and 3.

In an embodiment, a first torsion spring (not shown in the figure) is sleeved around the locking arm rotating shaft 2221, and the locking arm 222 has a rotation tendency in a direction from the first locking flange 2222 to the second locking flange 2223 via the locking groove 2224 under the action of the first torsion spring, i.e., the counterclockwise rotation tendency in FIGS. 3, 4 and 5. A second torsion spring (not shown in the figure) is sleeved around the unlocking arm rotating shaft 2231, and the unlocking arm 223 has a rotation tendency opposite to that of the locking arm 222 under the action of the second torsion spring, i.e., a clockwise rotation tendency in FIGS. 3, 4 and 5.

As shown in FIGS. 3, 4, and 5, the fixing plate 221 further has a first stop flange 2211 and a second stop flange 2212. When the locking member 22 is unlocked from the locking hook 12, that is, when the locking member 22 is in the unlocked state, the locking arm 222 rotates under the action of the first torsion spring, so that when the locking groove 2224 faces the locking hook 12 (that is, the rotation position of the locking arm 222 in FIG. 4), an edge of the second locking flange 2223 on the locking arm 222 abuts against the first stop flange 2211, thereby preventing the locking arm 222 from continuing rotating.

As shown in FIG. 3 and FIG. 2, the unlocking arm 223 further has a second positioning flange 2233. When the locking hook 12 is locked on the locking member 22, that is, when the locking member 22 is in the locking state, the second positioning flange 2233 abuts against the second stop flange 2212 under the action of the second torsion spring so as to prevent the unlocking arm 223 from continuing rotating, and further, the first positioning flange 2232 prevents the locking arm 222 from rotating towards the locking hook 12, to achieve the purpose of locking the locking hook 12.

As shown in FIGS. 2, 3, 4 and 5, the unlocking arm 223 further has an unlocking handle 2234 that is located at an end of the unlocking arm 223 away from the unlocking arm rotating shaft 2231 to rotate in a direction (clockwise direction in FIGS. 3, 4 and 5) against the action of the second torsion spring under the pushing of the unlocking member 13, so that the unlocking handle 2234 can be disengaged with the locking groove 2224 from a side of the first locking flange 2222 when the first positioning flange 2232 is located between the first locking flange 2222 and the second locking flange 2223 and abuts against the first locking flange 2222.

For example, in the embodiments shown in FIGS. 3, 4 and 5, the unlocking handle 2234 is located at an end of the unlocking arm 223 away from the unlocking arm rotating shaft 2231, and moves upward under the pushing of the unlocking member 13, so that the unlocking arm 223 rotates in the counterclockwise direction. Then, the first positioning flange 2232 shown in FIG. 3 is disengaged with the locking groove 2224 from a side of the first locking flange 2222. Further, the locking arm 222 rotates under the action of the first torsion spring, so that when the locking groove 2224 faces the locking hook 12, the edge of the second locking flange 2223 on the locking arm 222 just abuts against the first stop flange 2211, so as to prevent the locking arm 222 from continuing rotating, thereby forming the structural variation shown in FIG. 4. Thereafter, as shown in FIG. 5, the unlocking member 13 stops acting on the unlocking handle 2234, so that the unlocking arm 223 is returned to the original position under the action of the second torsion spring as shown in FIG. 3.

As shown in FIG. 2, in the embodiment of the present application, the unlocking member 13 includes an unlocking sleeve 131, an unlocking rod 132, and a return spring 133. The unlocking sleeve 131 is mounted on the battery assembly 1. For example, the battery assembly 1 may include a battery mounting plate 14, and the unlocking sleeve 131 may be mounted on a side of the battery mounting plate 14, which may be a part of 1, facing the battery 15. The unlocking rod 132 is mounted in the unlocking sleeve 131, and the unlocking rod 132 faces the end of the locking member 22, and there is a first distance between the unlocking rod 132 and the unlocking handle 2234. The return spring 133 is mounted in the unlocking sleeve 131 and is sleeved outside the unlocking rod 132 to provide the unlocking rod 132 with a force for increasing the first distance. Without applying an external force, the unlocking rod 132 is subjected to the force increasing the first distance under the action of the return spring 133 so as to be away from the unlocking rod 2234. With applying the external force, the unlocking rod 132 may resist the action of the return spring 133 so as to be close to the unlocking handle 2234, which can make the unlocking rod 132 abut against the unlocking handle 2234, thus unlocking the locking member 22.

In some specific embodiments, there may be at least one guide sleeve 11, at least one locking hook 12, at least one unlocking member 13, at least one guide rod 21, at least one locking member 22, and the numbers of the guide sleeve 11 and the guide rod 21 may be equal, and the number of the locking hook 12, the unlocking member 13 and the locking member 22 may be equal. In the embodiment shown in the drawings of the present application, there are 2 guide sleeves 11, 2 locking hooks 12, 2 guide rods 21 and 2 locking members 22. Adopting multiple guide sleeves 11, the locking hooks 12, the guide rods 21 and the locking members 22, the purpose of stable installation and alignment can be achieved, and the problem of inaccurate positioning between the battery assembly 1 and the body of the automated guided vehicle caused by the swinging of the positioning assembly can be reduced.

In some specific embodiments, when there are at least two locking hooks 12, the installation direction of at least one of the locking hooks 12 is not parallel to that of the other locking hooks 12. For example, in the embodiment shown in the drawings of the present application, the installation directions of the two locking hooks 12 are not parallel to each other, and the locking posts 122 of the two locking hooks 12 are perpendicular to each other.

In the embodiment of the present application, the battery assembly 1 further includes a female battery connector 16, which is mounted on the battery mounting plate 14 and electrically connected to the battery 15, and the female battery connector 16 is located on the side of the battery mounting plate 14 facing the battery 15; correspondingly, the positioning locking assembly also includes a male battery connector (not shown in the Figure) that is matches the position of the female battery connector 16. When the battery is installed, the position between the female battery connector 16 and the male battery connector may be simultaneously located, so as to realize the connection of the battery circuit.

In the embodiment of the present application, the process of mounting the battery is as follows:

pushing the battery assembly 1 to move towards the positioning assembly and perform coarse positioning, so that the guide rod 21 can enter the guide sleeve 11; further, after the guide rod 21 enters the guide sleeve 11, the positions of the locking hook 12 and the battery 15 are adjusted adaptively under the guidance of the guide rod 21 and the guide sleeve 11; and continuously pushing the battery assembly 1, so that the female battery connector 16 is butted with the male battery connector, and meanwhile, the locking hook 12 is locked with the locking member 22, so as to complete the battery installation.

In the embodiment of the present application, the process of locking the locking hook 12 to the locking member 22 is as follows.

The locking hook 12 is close to the locking member 22 and is pressed into the locking groove 2224 (at this time, the structural change of the locking member 22 is shown in FIG. 4; the locking groove 2224 faces the locking post 122 of the locking hook 12), and then one side of the locking groove 2224 located on the first locking flange 2222 is pressed by the locking post 122, thereby the locking arm 222 rotates around the locking arm rotating shaft 2221 against the action of the first torsion spring. Then the first locking flange 2222 is close to and in contact with the first positioning flange 2232, and then the first locking flange 2222 drives the unlocking arm 223 by pushing the first positioning flange 2232, so that the unlocking arm 223 rotates against the action of the second torsion spring, until the first locking flange 2222 passes the first positioning flange 2232, that is, the force of the first locking flange 2222 acting on the first positioning flange 2232 disappears. Then the unlocking arm 223 rotates under the action of the second torsion spring, so that the second positioning flange 2233 abuts against the second positioning flange 2212, at this time, the first positioning flange 2232 is located between the first locking flange 2222 and the second locking flange 2223 and abuts against the first locking flange 2222, thus the unlocking arm 223 is positioned under the combined action of the second torsion spring and the second stop flange 2212 without an external force acting on the unlocking rod 132, and the locking arm 222 is positioned under the combined action of the first positioning flange 2232 and the first torsion spring, thereby preventing the locking hook 12 from being disengaged with the locking groove 2224.

In the embodiment of the present application, the process of disassembling the battery is as follows.

The unlocking rod 132 is pushed from one side of the battery mounting plate 14 with a tool, the unlocking rod 132 pushes the locking member 22 to unlock the locking hook 12 from the locking member 22, and then the battery assembly 1 is pulled out to complete the disassembly of the battery.

In the embodiment of the present application, the process of unlocking the locking hook 12 from the locking member 22 is as follows:

The unlocking rod 132 pushes the unlocking handle 2234 against the action of the return spring 133 under the action of external force, so that the unlocking arm 223 rotates against the action of the second torsion spring and the first positioning flange 2232 is disengaged with the locking groove 2224 from a side of the first locking flange 2222, then the locking arm 222 rotates under the action of the first torsion spring, so that the locking hook 12 can be disengaged with the locking groove 2224, and the continuous rotation of the locking arm 222 is stopped due to the abutting of the first stop flange 2211. When the external force stops acting on the unlocking rod 132, the unlocking rod 132 is moved away from the unlocking handle 2234 under the action of the return spring 133, and then the unlocking arm 223 rotates under the action of the second torsion spring until the second positioning flange 2233 abuts against the second stop flange 2212.

Figure 6:
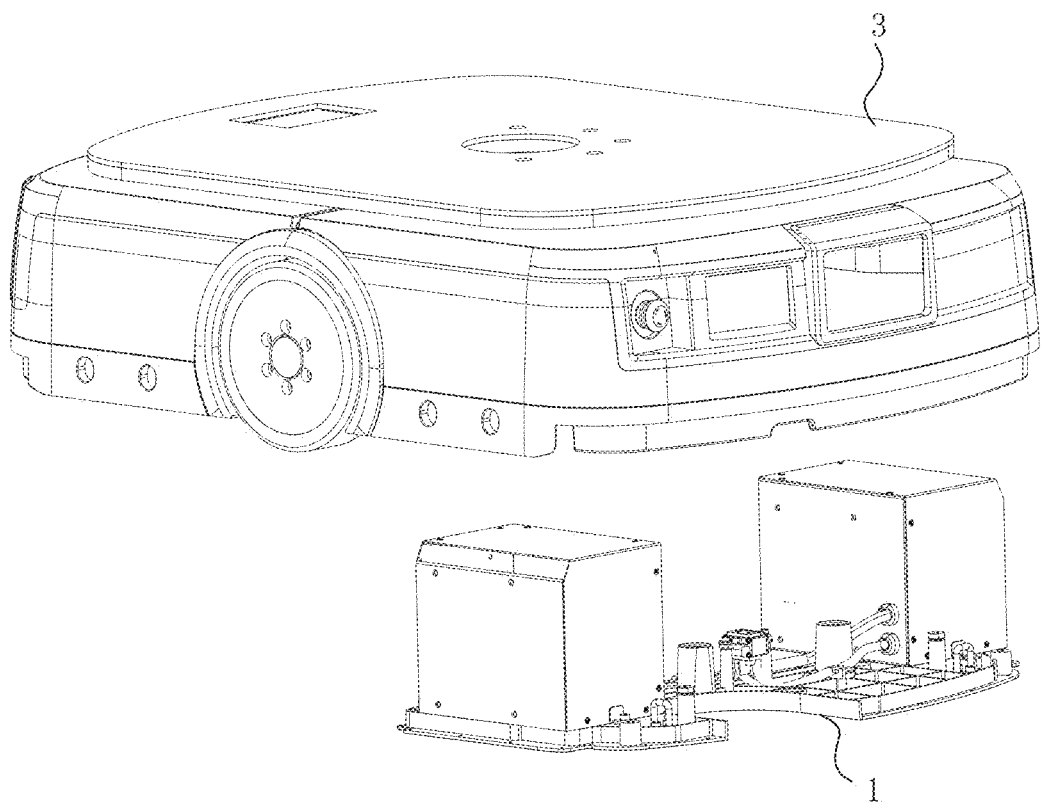
FIG. 6 is a schematic view of an automated guided vehicle according to an embodiment of the present application.

The embodiment of the present application further provides an automated guided vehicle, as shown in FIG. 6, which includes a body 3 and the battery assembly locking device described in the above embodiment. As shown in FIG. 6 and in combination with FIG. 2, the positioning assembly is mounted in the body 3 of the automated guided vehicle, so that the battery assembly 1 can realize blind insertion with the body 3 of the automated guided vehicle with the cooperation of the guide sleeve 11 and the guide rod 21. In addition, in the embodiment shown in FIG. 6, the battery assembly 1 may be inserted into the body 3 of the automated guided vehicle from the bottom of the body 3 of the automated guided vehicle.

Figure 7:
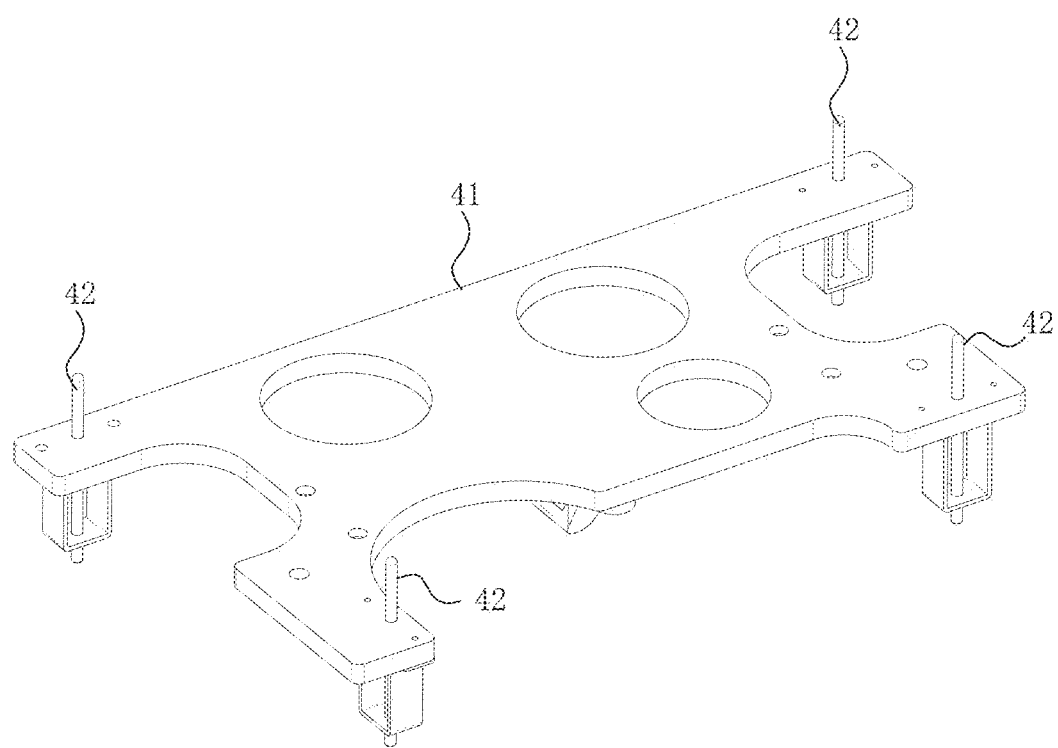
FIG. 7 is a schematic view of a battery unlocking device according to an embodiment of the present application.

The embodiment of the present application further provides a battery disassembling assembly which includes a battery unlocking device and the battery assembly locking device described in the above embodiment. As shown in FIG. 7, the battery unlocking device includes an unlocking plate 41 and an unlocking button 42, the unlocking button 42 is mounted on the unlocking plate 41, and the unlocking button 42 is matched with the unlocking member 13. When the battery unlocking device is in use, the unlocking plate 41 is close to the battery mounting plate 14 so that the unlocking button 42 is aligned with the unlocking member 13, and the unlocking plate 41 is pressed hard so that the unlocking button 42 presses the unlocking rod 132 to realize unlocking. The unlocking plate 41 in the embodiment of the present application can be used to unlock multiple unlocking members 13 at the same time, when a large amount of batteries need to be replaced, the battery disassembling assembly according to the embodiments of the present application can realize rapid disassembling, thereby improving battery replacement efficiency.

The battery assembly locking device, the automated guided vehicle and the battery disassembly assembly according to the embodiments of the application achieve the purposes of simplifying battery installation and locking by utilizing the cooperation of the locking hook and the locking member in the embodiments of the application. In addition, utilizing the battery unlocking device in the battery disassembling assembly according to the embodiments of the present application realizes that a plurality of unlocking rods of the battery assembly are simultaneously pushed to unlock the battery, thereby achieving the purpose of facilitating the battery disassembling.

The embodiments described above are simply preferred embodiments of this application, and are not intended to limit the scope of protection of the present invention, and any modifications, equivalent replacement, improvements, etc. within the spirit and principle of this application should be included within the protection scope of the present invention.

What is claimed is:

1. A battery assembly locking device, comprising:
   a battery assembly;
   a locking hook mounted on the battery assembly;
   a locking member mounted on a body of an automated guide vehicle; and
   an unlocking member mounted on the battery assembly; wherein,
   the battery assembly is locked on the body of the automated guided vehicle by locking the locking hook to the locking member;
   the unlocking member pushes the locking member such that the locking hook unlocks with the locking member, wherein the unlocking member includes:
   an unlocking sleeve mounted on the battery assembly;
   an unlocking rod that is mounted in the unlocking sleeve and faces an end of the locking member, wherein there is a first distance between the unlocking rod and an unlocking handle provided in the locking member; and
   a return spring that is mounted in the unlocking sleeve and is sleeved outside the unlocking rod to provide the unlocking rod with a force for increasing the first distance.

2. The battery assembly locking device according to claim 1, wherein,
   the locking hook comprises a fixing post and a locking post; and wherein,
   an end of the fixing post is mounted on the battery assembly, and the locking post and the fixing post are integrally formed and is lockable on the locking member.

3. The battery assembly locking device according to claim 2, wherein the locking member comprises:
   a fixing plate mounted on the body of the automated guided vehicle;
   a locking arm connected to the fixing plate through a locking arm rotating shaft on the fixing plate, and the locking arm has a first rotational degree of freedom with the locking arm rotating shaft as an axis;
   an unlocking arm connected to the fixing plate through an unlocking arm rotating shaft on the fixing plate, and the unlocking arm has a second rotational degree of freedom with the unlocking arm rotating shaft as an axis, wherein the unlocking arm rotating shaft is parallel to the locking arm rotating shaft; wherein,
   the locking arm has a first locking flange and a second locking flange, a locking groove is formed between the first locking flange and the second locking flange, and when the locking hook is locked on the locking member, the locking post is located in the locking groove;
   the unlocking arm has a first positioning flange, when the locking hook is locked on the locking member, the first positioning flange is located between the first locking flange and the second locking flange, and the first positioning flange abuts against the first locking flange.

4. The battery assembly locking device according to claim 3, wherein, a first torsion spring is sleeved around the locking arm rotating shaft, and the locking arm has a rotation tendency in a direction from the first locking flange to the second locking flange via the locking groove under the action of the first torsion spring;

a second torsion spring is sleeved around unlocking arm rotating shaft, and the unlocking arm has a rotation tendency opposite to that of the locking arm under the action of the second torsion spring;

the fixing plate further has a first stop flange and a second stop flange; wherein, when the locking member is unlocked from the locking hook, the locking arm rotates under the action of the first torsion spring, so that when the locking groove faces the locking hook, an edge of the second locking flange on the locking arm abuts against the first stop flange;

the unlocking arm further has a second positioning flange, and when the locking hook is locking on the locking member, the second positioning flange abuts against the second stop flange under the action of the second torsion spring.

5. The battery assembly locking device according to claim 4, wherein, the unlocking handle is located at an end of the unlocking arm away from the unlocking arm rotating shaft, to rotate in a direction against the action of the second torsion spring under the pushing of the unlocking member, so that the unlocking handle is disengaged with the locking groove from a side of the first locking flange when the first positioning flange is located between the first locking flange and the second locking flange and abuts against the first locking flange.

6. The battery assembly locking device according to claim 1, wherein the battery assembly includes:

a battery mounting plate;

a battery mounted on the battery mounting plate; wherein, the locking hook is mounted on the battery mounting plate and is located on a side of the battery mounting plate facing the battery.

7. The battery assembly locking device according to claim 1, further comprising:

a positioning assembly; wherein, the battery assembly and the body of the automated guiding vehicle are mutually positioned with each other through the positioning assembly.

8. The battery assembly locking device according to claim 7, wherein the positioning assembly comprises:

a guide sleeve mounted on the battery assembly;

a guide rod mounted on the body of the automated guide vehicle; wherein, the battery assembly and the body of the automated guided vehicle are mutually positioned with each other through a connection between the guide sleeve and the guide rod.

9. The battery assembly locking device according to claim 8, wherein the battery assembly includes:

a battery mounting plate; wherein, a battery, which is mounted on the battery mounting plate; wherein, the guide sleeve is mounted on the battery mounting plate and is located on a side of the battery mounting plate facing the battery, the guide sleeve has a guide rod receiving cavity facing the guide rod for receiving the guide rod.

10. The battery assembly locking device according to claim 1, wherein, the battery assembly locking device comprises one or more locking hooks, one or more locking members, and one or more unlocking members, and the numbers of the locking hooks, the locking members and the unlocking members are equal;

when the battery assembly locking device comprises at least two locking hooks, an mounting direction of at least one of the locking hooks is not parallel to mounting directions of the other locking hooks.

11. An automated guided vehicle, comprising, the battery assembly locking device according to claim 1 and an body of the automated guided vehicle.

* * * * *